US012607452B2

(12) United States Patent
Li et al.

(10) Patent No.: US 12,607,452 B2
(45) Date of Patent: Apr. 21, 2026

(54) 2D AREA ARRAY CAMERA-LINE LASER 3D SENSOR JOINT CALIBRATION METHOD AND DEVICE

(71) Applicant: JIANGSU JITRI INTELLIGENT OPTOELECTRONIC SYSTEM RESEARCH INSTITUTE CO., LTD., Jiangsu (CN)

(72) Inventors: Suqi Li, Jiangsu (CN); Zhipeng Wei, Jiangsu (CN); Lei Huang, Jiangsu (CN); Zhuanwei Cheng, Jiangsu (CN)

(73) Assignee: JIANGSU JITRI INTELLIGENT OPTOELECTRONIC SYSTEM RESEARCH INSTITUTE CO., LTD., Jiangsu (CN)

( * ) Notice: Subject to any disclaimer, the term of this patent is extended or adjusted under 35 U.S.C. 154(b) by 118 days.

(21) Appl. No.: 18/569,226

(22) PCT Filed: Mar. 28, 2023

(86) PCT No.: PCT/CN2023/084250
§ 371 (c)(1),
(2) Date: Dec. 12, 2023

(87) PCT Pub. No.: WO2024/138916
PCT Pub. Date: Jul. 4, 2024

(65) Prior Publication Data
US 2025/0085101 A1 Mar. 13, 2025

(30) Foreign Application Priority Data
Dec. 27, 2022 (CN) .......................... 202211706672.5

(51) Int. Cl.
*G01B 11/00* (2006.01)
*G01B 11/25* (2006.01)
(Continued)

(52) U.S. Cl.
CPC ........ *G01B 11/002* (2013.01); *G01B 11/2504* (2013.01); *G01B 21/042* (2013.01); *G01S 7/497* (2013.01); *G06T 7/80* (2017.01)

(58) Field of Classification Search
CPC ....... G01B 11/002; G01B 11/24; G01B 11/25; G01B 11/2504; G01B 11/2518;
(Continued)

(56) References Cited

U.S. PATENT DOCUMENTS 4,641,960 A * 2/1987 Bozzolato .............. G01C 11/00
356/14
5,177,563 A * 1/1993 Everett .................. B25J 19/021
356/621
(Continued)

FOREIGN PATENT DOCUMENTS

CN 101694370 A * 4/2010
CN 104089579 A * 10/2014
(Continued)

OTHER PUBLICATIONS

"International Search Report (Form PCT/ISA/210) of PCT/CN2023/084250," mailed on Aug. 21, 2023, pp. 1-5.
(Continued)

*Primary Examiner* — Gordon J Stock, Jr.
(74) *Attorney, Agent, or Firm* — JCIPRNET

(57) ABSTRACT

A 2D area array camera-line laser 3D sensor joint calibration method, comprising: establishing a 3D coordinate system of the line laser 3D sensor, and obtaining 3D coordinates of a light bar point on the 2D area array camera; placing a target at a common measurement position, and allowing the 2D area array camera to acquire images of intersection lines of three sets of laser plane and cylinders and the image coordinates of three sets of laser light bars respectively; calculating 3D coordinates of the light bar point in a 2D area array
(Continued)

camera coordinate system, and calculating three ellipse center position coordinates; directly acquiring 3D coordinates of three sets of laser light bars in the 3D sensor coordinate system from the line laser 3D sensor, and calculating three ellipse center position coordinates; and calculating a conversion distance between two coordinate systems.

5 Claims, 1 Drawing Sheet

(51) Int. Cl.
| | |
|---|---|
| *G01B 21/04* | (2006.01) |
| *G01S 7/497* | (2006.01) |
| *G06T 7/80* | (2017.01) |

(58) Field of Classification Search
CPC ........... G01B 11/2545; G01B 11/2513; G01B 21/02; G01B 21/04; G01B 21/042; G01B 21/045; G01S 7/497; G01C 25/00; G01C 11/00; G01C 11/02; G01C 11/025
See application file for complete search history.

(56) References Cited

U.S. PATENT DOCUMENTS

| | | | | |
|---|---|---|---|---|
| 5,603,318 | A * | 2/1997 | Heilbrun | H04N 13/239 |
| | | | | 348/E13.016 |
| 5,666,202 | A * | 9/1997 | Kyrazis | B25J 9/1697 |
| | | | | 356/614 |
| 6,339,683 | B1 * | 1/2002 | Nakayama | G01C 11/00 |
| | | | | 116/202 |
| 7,429,999 | B2 * | 9/2008 | Poulin | G06T 7/521 |
| | | | | 348/187 |
| 7,576,847 | B2 * | 8/2009 | Bridges | G01S 5/163 |
| | | | | 356/138 |
| 7,979,159 | B2 * | 7/2011 | Fixell | G05B 19/4015 |
| | | | | 700/254 |
| 8,094,321 | B2 * | 1/2012 | Lee | G01C 11/02 |
| | | | | 356/602 |
| 10,247,545 | B2 * | 4/2019 | Elliot | B25J 9/1692 |
| 10,657,665 | B2 * | 5/2020 | Kim | G06T 7/73 |
| 11,143,499 | B2 * | 10/2021 | Kim | G06T 7/593 |
| 2003/0056566 | A1 * | 3/2003 | Nashiki | B25J 9/1692 |
| | | | | 73/1.79 |
| 2022/0128671 | A1 | 4/2022 | Parian et al. | |
| 2022/0357153 | A1 * | 11/2022 | Konishi | G01B 11/24 |
| 2025/0123396 | A1 * | 4/2025 | Goh | G01S 17/48 |

FOREIGN PATENT DOCUMENTS

| | | | | |
|---|---|---|---|---|
| CN | 106127745 | | 11/2016 | |
| CN | 105136031 B | * | 9/2017 | |
| CN | 107014329 B | * | 4/2019 | ........... G01B 21/045 |
| CN | 109676636 A | * | 4/2019 | ........... B25J 13/088 |
| CN | 110672049 A | * | 1/2020 | ........... G01B 21/00 |
| CN | 111351461 A | * | 6/2020 | ........... G01B 21/042 |
| CN | 211626384 U | * | 10/2020 | |
| CN | 113251944 A | * | 8/2021 | ........... G01B 21/00 |
| CN | 113554708 A | * | 10/2021 | ............... G06T 7/70 |
| CN | 113610929 | | 11/2021 | |
| CN | 113681559 | | 11/2021 | |
| CN | 215639489 U | * | 1/2022 | |
| CN | 114022566 | | 2/2022 | |
| CN | 114463431 A | * | 5/2022 | ............... G06T 7/80 |
| CN | 114758006 A | * | 7/2022 | ............... G06T 7/85 |
| CN | 113138375 B | * | 11/2022 | ............... G06T 7/80 |
| CN | 115371564 A | * | 11/2022 | ........... G01B 11/00 |
| CN | 115792869 | | 3/2023 | |
| JP | H09329425 A | * | 12/1997 | |
| JP | 3237414 B2 | * | 12/2001 | ............... G06T 7/85 |
| JP | 2004333368 A | * | 11/2004 | |
| JP | 4496354 B2 | * | 7/2010 | ........... G01B 11/002 |
| JP | 4877891 B2 | * | 2/2012 | ........... G01B 21/042 |
| JP | 2012124670 A | * | 8/2012 | |
| KR | 20100007506 A | * | 1/2010 | ........... H04N 5/2625 |
| WO | WO-2009120073 A2 | * | 10/2009 | ........... G06T 7/521 |

OTHER PUBLICATIONS

"Written Opinion of the International Searching Authority (Form PCT/ISA/237) of PCT/CN2023/084250," mailed on Aug. 21, 2023, pp. 1-4.

* cited by examiner

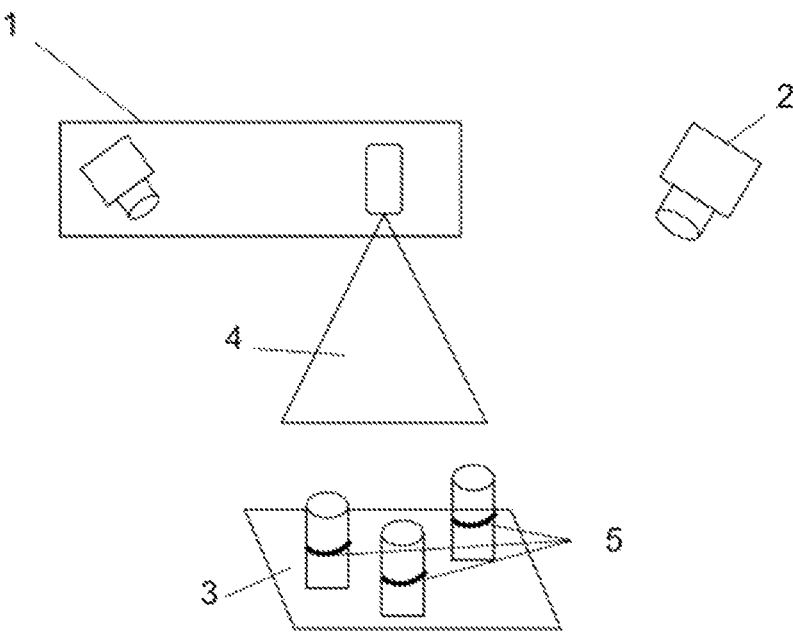

2D AREA ARRAY CAMERA-LINE LASER 3D SENSOR JOINT CALIBRATION METHOD AND DEVICE

CROSS-REFERENCE TO RELATED APPLICATION

This application is a 371 of international application of PCT application serial no. PCT/CN2023/084250, filed on Mar. 28, 2023, which claims the priority benefit of China application no. 202211706672.5, filed on Dec. 27, 2022.

TECHNICAL FIELD

The present invention relates to a 2D area array camera-line laser 3D sensor joint calibration method and device and belongs to the technical field of visual 3D measurement.

RELATED ART 3D sensors based on line lasers have become an important sensor type on the market, and there are quite a few mature products. A line laser 3D sensor projects the line laser onto the surface of an object to be measured. After being modulated by the surface of the object, a light bar is formed. After the light bar is collected by an image sensor and processed by computation, the 3D point coordinates of the light bar on the surface of the object can be directly output, where the measurement coordinate system is defined by the sensor itself, and its specific position and the internal parameters of the 3D sensor are typically not disclosed, which brings inconvenience to the need to build multi-type and hetero-geneous visual measurement systems.

Currently, in a multi-view measurement system that uses two or more industrial cameras, the measurement results of each individual visual sensor need to be unified into a 3D coordinate system, and the relative positional relationship between multiple visual sensors needs to be known, repre-sented by the rotation matrix R and the shift vector t. The process of obtaining the R, t matrix is called extrinsic calibration between binocular or multi-camera industrial cameras. Generally, the intrinsic parameters of each indus-trial camera are used, and it is completed with the help of 2D (two-dimensional) planar targets, 3D (three-dimensional) targets, etc. However, some integrated 3D sensors generally only output 3D coordinates under their own defined coor-dinate system and do not open their intrinsic parameters and process images captured by the camera to the outside world. Therefore, existing traditional methods are used for multi-sensor extrinsic calibration. For example, in a combined measurement system using a line laser 3D sensor and a 2D area array camera, the output results of the line laser 3D sensor need to be imported into the coordinate system of other 2D area array cameras, which means that the relative positional relationship between the 2D area array camera and the 3D sensor is required. However, since the 3D sensor neither disclose intrinsic parameters nor output image infor-mation, the traditional binocular calibration method cannot be used.

SUMMARY OF INVENTION

An objective of the present invention is to provide a 2D area array camera-line laser 3D sensor joint calibration method and device to solve the defects of the prior art.

A 2D area array camera-line laser 3D sensor joint cali-bration method, including:

combining a line laser 3D sensor and a 2D area array camera into a line structured light vision model, and calibrating the line structured light vision model by using a 2D plane target method;

establishing a 3D coordinate system of the line laser 3D sensor with an origin at an optical center of the 2D area array camera, and obtaining 3D coordinates of a light bar point on the 2D area array camera;

placing a target with no less than three cylinder features at a common measurement position of the line laser 3D sensor and the 2D area array camera, and allowing the 2D area array camera to acquire images of intersection lines of a laser plane and cylinders and then acquire image coordinates of three sets of laser light bars respectively;

calculating 3D coordinates of the light bar point in a 2D area array camera coordinate system according to the 3D coordinates of the light bar point, and implementing an ellipse fitting algorithm to calculate three ellipse center position coordinates respectively;

directly acquiring 3D coordinates of three sets of laser light bars in the 3D sensor coordinate system from the line laser 3D sensor, and implementing the ellipse fitting algorithm to calculate three ellipse center posi-tion coordinates respectively; and according to the 3D coordinates in the 2D area array camera coordinate system and the 3D coordinates in the line laser 3D sensor coordinate system, calculating a conversion distance between the two coordinate sys-tems, thus completing the joint calibration.

Further, the operation of obtaining the 3D coordinates of the light bar point on the 2D area array camera includes:

setting an X-axis of the line structured light vision model as a transverse axis of a photosensitive surface and a Y-axis as a longitudinal axis of the photosensitive surface;

obtaining intrinsic parameters of the 2D area array cam-era, expressed as $$K = \begin{bmatrix} fx & & u0 \\ & fy & v0 \\ & & 1 \end{bmatrix},$$

then obtaining a relationship between the image coordi-nates of a certain light bar point on the 2D area array camera and its 3D coordinates as follows:

$$s \cdot [u \ v \ 1]^T = K \cdot [x \ y \ z]^T,$$

after calibration of the line structured light vision model, obtaining the coordinates of its laser plane in the 2D area array camera coordinate system, expressed as:

$$[a \ b \ c \ d] \cdot [x \ y \ z \ 1]^T = 0,$$

from the above equations, obtaining 3D coordinates of the certain light bar point on the 2D area array camera as follows:

$$x = z \cdot (u - u0)/fx$$

$$y = z \cdot (v - v0)/fy$$

$$z = -1 \cdot \left[ a \cdot (u - u0)/fx + b \cdot (v - v0)/fy + c \right]^{-1},$$

where: fx represents an x-axis component of a camera focal length, fy represents a y-axis component of the camera focal length, u0 represents a u-axis coordinate of a camera image origin, v0 represents a v-axis coordinate of the camera image origin, u represents a u-axis coordinate of a camera image pixel point, v represents a v-axis coordinate of the camera image pixel point, x represents an x-axis coordinate of a measured point in a camera space coordinate system, y represents a y-axis coordinate of the measured point in the camera space coordinate system, and z represents a z-axis coordinate of the measured point in the camera space coordinate system; a, b, c, and d are laser plane coordinate coefficients; T represents a vector transpose and s represents a scale factor.

Further, the cylinder features are installed in parallel on a plane, any three of central axes of the plurality of cylinders are not coplanar, and the relative positional relationship between the cylinders remains unchanged after installation.

Further, the target is placed at least once to complete the calibration.

Furthermore, step of placing the target ensures that the intersection lines between the laser plane and the three cylinders are obtained, and at the same time, are within acquisition ranges of the 3D sensor and the 2D area array camera.

A 2D area array camera-line laser 3D sensor joint calibration device, including a target for calibrating with no less than three cylinders, a line laser 3D sensor and a 2D area array camera;

wherein central axes of all the cylinders of the target are parallel to each other, and the central axes of any three cylinders are not in the same plane;

during calibration, the target with multi-cylinders is placed in a common measurement area of the line laser 3D sensor and the 2D area array camera, and then a line laser of the line laser 3D sensor intersects with the cylinders to form three arc-shaped laser light bars; the 2D area array camera and the line laser form a line structured light vision model, and the calibration is completed by using a plane target method.

Compared with the prior art, the present invention has the following beneficial effects.

The present invention provides a multi-cylinder target-based 2D area array camera-line laser 3D sensor joint calibration method and device. Compared with the traditional method, the present invention has the following advantages. First, the measurement results of the 3D sensor can be used directly without the need to open its intrinsic parameters or to obtain 2D images it captures. Second, only the cylindricity of the cylinders, instead of making a particularly precise target, is required. The processing difficulty of machine turning is low, and there is no need to obtain the coordinate values of the target feature points in advance. Third, without considering random errors, joint calibration can be completed with only one placement and photographing, rather than relying on multiple placements.

BRIEF DESCRIPTION OF DRAWINGS

FIGURE is a schematic diagram of a device according to the present invention.

DESCRIPTION OF EMBODIMENTS

In order to make the technical means, creative features, objectives and effects achieved by the present invention easy to understand, the present invention will be further elaborated below in conjunction with specific embodiments.

The present invention discloses a 2D area array camera-line laser 3D sensor joint calibration method, including followings.

(1) A target with no less than three cylinder features is made, wherein the cylinder features are installed in parallel on a plane, any three of central axes of the plurality of cylinders are not coplanar, and the relative positional relationship between the cylinders remains unchanged after installation.

(2) The positions of a line laser 3D sensor and a 2D area array camera are fixed, wherein their measurement areas overlap.

(3) The line laser 3D sensor and the 2D area array camera into a separate line structured light vision model are combined, and the line structured light vision model is calibrated by using a 2D plane target method; a 3D coordinate system with an origin at an optical center of the 2D area array camera is established, wherein the X-axis is the transverse axis of a photosensitive surface and the Y-axis is the longitudinal axis of the photosensitive surface.

The intrinsic parameters of the 2D area array camera are obtained as $$K = \begin{bmatrix} fx & & u0 \\ & fy & v0 \\ & & 1 \end{bmatrix},$$

then obtaining a relationship between the image coordinates of a certain light bar point on the 2D area array camera and its 3D coordinates as follows:

$$s \cdot [u \quad v \quad 1]^T = K \cdot [x \quad y \quad z]^T,$$

after calibration of the line structured light vision model, obtaining the coordinates of its laser plane in the 2D area array camera coordinate system, expressed as:

$$[a \quad b \quad c \quad d] \cdot [x \quad y \quad z \quad 1]^T = 0,$$

from the above equation, obtaining 3D coordinates of the certain light bar point on the 2D area array camera as follows:

5 6

$$x = z \cdot (u - u0)/fx$$

$$y = z \cdot (v - v0)/fy$$

$$z = -1 \cdot \left[ a \cdot (u - u0)/fx + b \cdot (v - v0)/fy + c \right]^{-1},$$

where: fx represents an x-axis component of a camera focal length, fy represents a y-axis component of the camera focal length, u0 represents a u-axis coordinate of a camera image origin, v0 represents a v-axis coordinate of the camera image origin, u represents a u-axis coordinate of a camera image pixel point, v represents a v-axis coordinate of the camera image pixel point, x represents an x-axis coordinate of a measured point in a camera space coordinate system, y represents a y-axis coordinate of the measured point in the camera space coordinate system, and z represents a z-axis coordinate of the measured point in the camera space coordinate system; a, b, c, and d are laser plane coordinate coefficients; T represents a vector transpose and s represents a scale factor.

(4) The target is placed at the common measurement position of the line laser 3D sensor and the 2D area array camera. The 2D area array camera acquires images of the intersection lines of the laser plane and three cylinders and then acquires image coordinates of three sets of laser light bars respectively. Based on the above formula, their 3D coordinates in the 2D area array camera coordinate system are obtained, and the ellipse fitting algorithm is implemented to calculate three ellipse center position coordinates respectively, denoted as C1, C2, and C3. The coordinates are in the form of column vectors. If there are more than three cylinders, the center position coordinates are denoted C1, C2, C3 . . . Cn.

(5) The 3D coordinates of the three sets of laser light bars in the 3D sensor coordinate system are directly obtained from the line laser 3D sensor, and the ellipse fitting algorithm is implemented to calculate three ellipse center position coordinates respectively. Devices are denoted D1, D2 and D3, and the coordinates are in the form of column vectors. If there are more than three cylinders, the center position coordinates are denoted D1, D2, D3. . . . Dn.

(6) The conversion matrix from the 3D sensor to the 2D area array camera is set as R, t, where R represents the rotation matrix and t represents the shift vector; and then, according to the following formula, the least squares method is implemented to calculate R and t to complete the joint calibration, expressed as:

$$[ C1 \quad C2 \quad C3 \quad \ldots \quad Cn ] = R[ D1 \quad D2 \quad D3 \quad \ldots \quad Dn ] + t \cdot [ 1 \quad 1 \quad 1 \quad \ldots \quad 1 ].$$

As shown in FIGURE, the present invention further discloses a calibration device for jointing a 2D area array camera 2 and a line laser 3D sensor 3, including:

designing and using a calibration target 3 with no less than three cylinders;

wherein the target 3 can be made by only fixing the three machined cylinders on a flat base plate, without the need to obtain the relative positional relationship of the three cylinders in advance;

central axes of all the cylinders of the target 3 are parallel to each other, and the central axes of any three cylinders are not in the same plane.

During calibration, the multi-cylinder target is placed in the common measurement area of a line laser 3D sensor 1 and a 2D area array camera 2, and then the line laser of the line laser 3D sensor 1 intersects with the cylinders to form three arc-shaped laser light bars. The 2D area array camera 2 and the line laser form a line structured light vision model, and the calibration is completed by using a plane target method. Then, the 3D point coordinates of the three light bars in the 2D area array camera coordinate system can be obtained through the line structured light vision model. The three light bars are all elliptical arc segments 5 on the laser plane 4. The ellipse fitting algorithm can be implemented to obtain the ellipse center coordinates, which are the intersection coordinates of the laser plane 4 and the central axes of the three cylinders, and are expressed in the 2D area array camera coordinate system. In the meanwhile, the 3D point coordinates of the three light bars in the 3D sensor coordinate system can be directly obtained by the sensor. The coordinates of intersections between the laser plane 4 and the central axes of three cylinders are obtained by the same method and expressed in the 3D sensor coordinate system. Since the intersections between the laser plane 4 and the central axes of the three cylinders are fixed and unique, the conversion distance between the two coordinate systems can be calculated using the coordinate values of the three intersections in the 2D area array camera coordinate system and the 3D sensor coordinate system, thus completing joint calibration.

In this embodiment, the calibration can be completed by placing the target at least once, and the impact of random errors can be reduced by placing the target multiple times.

The target placement only needs to ensure that the intersection lines between the laser plane and the three cylinders are obtained, and at the same time, are within the acquisition ranges of the 3D sensor and the 2D area array camera. There is no requirement for the target placement angle.

The above are only the preferred embodiments of the invention. It should be pointed out that those of ordinary skill in the art can also make several improvements and modifications without departing from the technical principles of the invention, and these improvements and modifications should also be regarded as falling within the scope of the invention.

What is claimed is:

1. A two-dimensional area array camera-line laser three-dimensional sensor joint calibration method, characterized by comprising:

combining a line laser three-dimensional sensor and a two-dimensional area array camera into a line structured light vision model, and calibrating the line structured light vision model by using a two-dimensional plane target method;

establishing a three-dimensional coordinate system of the line laser three-dimensional sensor with an origin at an optical center of the two-dimensional area array camera, and obtaining three-dimensional coordinates of a light bar point on the two-dimensional area array camera;

placing a target with no less than three cylinder features at a common measurement position of the line laser three-dimensional sensor and the two-dimensional area array camera, and allowing the two-dimensional area array camera to acquire images of intersection lines of a laser plane and three cylinders and then acquire image coordinates of three laser light bars respectively;

calculating three-dimensional coordinates of the light bar point in a two-dimensional area array camera coordinate system according to the three-dimensional coordinates of the light bar point, and implementing an ellipse fitting algorithm to calculate three ellipse center position coordinates respectively;

directly acquiring three-dimensional coordinates of the three laser light bars in the three-dimensional coordinate system of the line laser three-dimensional sensor from the line laser three-dimensional sensor, and implementing the ellipse fitting algorithm to calculate three ellipse center position coordinates respectively; and according to the three-dimensional coordinates in the two-dimensional area array camera and the three-dimensional coordinates in the line laser three-dimensional sensor, calculating a conversion distance between two coordinate systems, thus completing joint calibration.

2. The two-dimensional area array camera-line laser three-dimensional sensor joint calibration method according to claim 1, wherein obtaining the three-dimensional coordinates of the light bar point on the two-dimensional area array camera comprises:

setting an X-axis of the line structured light vision model as a transverse axis of a photosensitive surface and a Y-axis as a longitudinal axis of the photosensitive surface;

obtaining intrinsic parameters of the two-dimensional area array camera, expressed as $$K = \begin{bmatrix} fx & & u0 \\ & fy & v0 \\ & & 1 \end{bmatrix},$$

then obtaining a relationship between image coordinates of a certain light bar point on the two-dimensional area array camera and its three-dimensional coordinates as follows:

$$s \cdot [\, u \quad v \quad 1 \,]^T = K \cdot [\, x \quad y \quad z \,]^T,$$

after calibration of the line structured light vision model, obtaining coordinates of its laser plane in the two-dimensional area array camera, expressed as:

$$[\, a \quad b \quad c \quad d \,] \cdot [\, x \quad y \quad z \quad 1 \,]^T = 0,$$

from above equations, obtaining three-dimensional coordinates of the certain light bar point on the two-dimensional area array camera as follows:

$$x = z \cdot (u - u0)/fx$$

$$y = z \cdot (v - v0)/fy$$

$$z = -1 \cdot \left[ a \cdot (u - u0)/fx + b \cdot (v - v0)/fy + c \right]^{-1},$$

where: fx represents an x-axis component of a camera focal length, fy represents a y-axis component of the camera focal length, u0 represents a u-axis coordinate of a camera image origin, v0 represents a v-axis coordinate of the camera image origin, u represents a u-axis coordinate of a camera image pixel point, v represents a v-axis coordinate of the camera image pixel point, x represents an x-axis coordinate of a measured point in a camera space coordinate system, y represents a y-axis coordinate of the measured point in the camera space coordinate system, and z represents a z-axis coordinate of the measured point in the camera space coordinate system; a, b, c, and d are laser plane coordinate coefficients; T represents a vector transpose and s represents a scale factor.

3. The two-dimensional area array camera-line laser three-dimensional sensor joint calibration method according to claim 1, wherein the cylinder features are installed in parallel on a plane, any three of central axes of a plurality of cylinders are not coplanar, and a relative positional relationship between the cylinders remains unchanged after installation.

4. The two-dimensional area array camera-line laser three-dimensional sensor joint calibration method according to claim 1, wherein the target is placed at least once to complete the joint calibration.

5. The two-dimensional area array camera-line laser three-dimensional sensor joint calibration method according to claim 1, wherein step of placing the target ensures that the intersection lines between the laser plane and the three cylinders are obtained, and at the same time, are within acquisition ranges of the line laser three-dimensional sensor and the two-dimensional area array camera.

* * * * *